May 15, 1945.  T. W. JOHNSON  2,375,850
CULTIVATOR AND PLANTING ATTACHMENT THEREFOR
Filed March 23, 1942   4 Sheets-Sheet 4
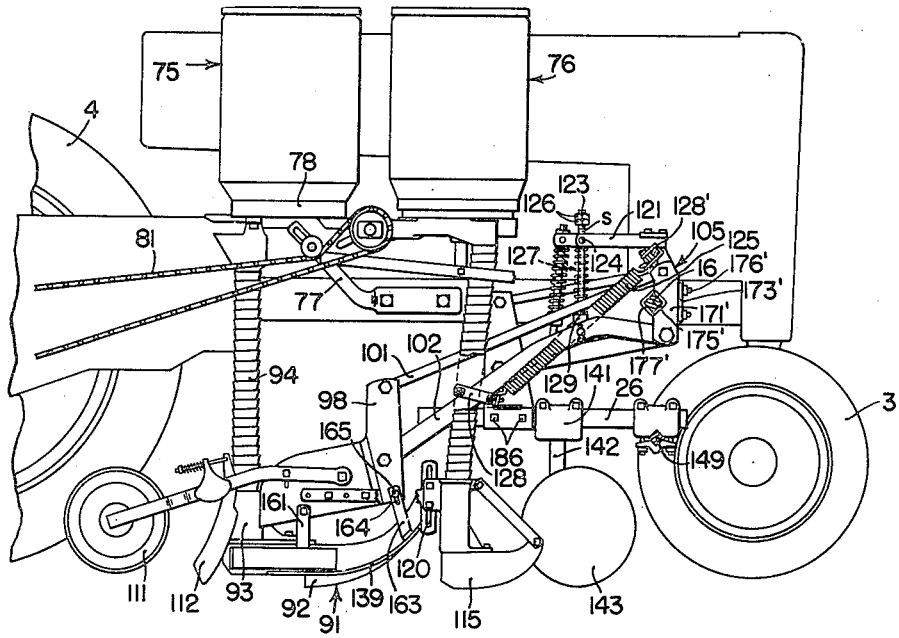
FIG. 4
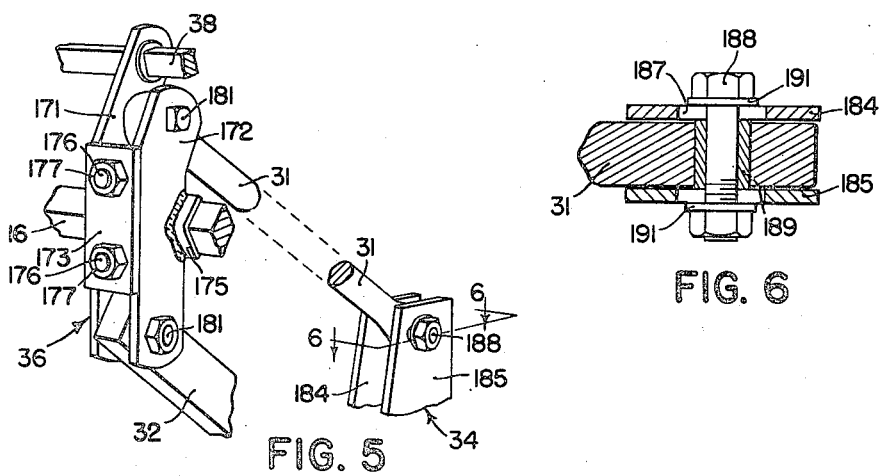
FIG. 5  FIG. 6
INVENTOR
THEODORE W. JOHNSON
BY
ATTORNEYS Patented May 15, 1945

2,375,850

UNITED STATES PATENT OFFICE 2,375,850

CULTIVATOR AND PLANTING ATTACHMENT THEREFOR

Theodore W. Johnson, Moline, Ill., assignor to Deere & Company, Moline, Ill., a corporation of Illinois Application March 23, 1942, Serial No. 435,849

26 Claims. (Cl. 111—52)

The present invention relates generally to agricultural implements and more particularly to tillage tools, such as those adapted for cultivating row crops and the like, and to planting attachments for such tools whereby both tillage and planting operations may be performed at the same time.

The object and general nature of the present invention is the provision of new and useful improvements in a cultivator of the tractor mounted type, which not only facilitates the use of the implement as a cultivator per se for row crops and the like but also facilitates the attachment of planting means whereby a planting implement is provided by means of only a few additional parts. It is also an important feature of this invention to provide certain new and useful improvements in a planting implement wherein the planting means is floatingly associated with ground working tools.

In connection with the cultivating implement, it is a feature of this invention to provide raising and lowering means at the rear of the tractor, adjacent the operator's station, connected with the rig raising and lowering means at the front of the tractor through lifting members which are disposed laterally outwardly with respect to the rigs and tractor so that such members lie outside the lines or planes passing through the eye of the operator at said station and the marginal portions or extremities of the open space between the rigs of each pair. Particularly is it a feature of this invention to provide a lifting connection with the rigs that include portions disposed substantially vertically above the outer rigs of each set, thereby assuring that such members will be entirely outside the operator's line of vision as regards the space between the cultivator rigs. According to this invention it is therefore possible to look directly at the space between the cultivator rigs through which the plants pass without having to look around rods, braces or other structural parts which, if in the line of vision, make it quite tiring to watch the crop closely during cultivating operations.

Another important feature of this invention is the provision of a planting attachment for a tractor mounted cultivator, such as the one referred to above, in which the seed container and the fertilizer container if one is furnished, is mounted in the forward portion of the space between the laterally outwardly disposed lifting member and that side of the tractor whereby such container or containers do not interfere with the operator's view of the ground. It is also a feature of this invention to provide means for floatingly associating the planter furrow opener with the cultivator beams, preferably between the latter, whereby the cultivator beams and any tools secured thereto may move vertically relative to the planting means and thereby not affect the position of the latter. It is still further an additional feature of this invention to provide improved lifting means whereby, while the aforesaid relative movement between the planting unit and the ground engaging tools is accommodated, yet both the planting means and the ground engaging tool beams are raised to substantially the same height for transport purposes. More specifically, it is a feature of this invention to provide means in the nature of a lost motion connection between the raising means and the planting means, thereby providing for necessary adjustments of the ground engaging means without changing the position of the planting means, such lost motion means being connected to the planting means in such manner that after the lost motion has been taken up the planting means is raised at a faster rate than the corresponding raising movement of the ground engaging tools, whereby both reach a position of substantially the same height by the time the parts are raised into their transport position.

These and other objects and advantages of the present invention will be apparent to those skilled in the art after a consideration of the following detailed description, taken in conjunction with the accompanying drawings.

In the drawings:

Figure 4 is a section taken generally along the line 4—4 of Figure 2, showing the connecting linkage between the draft bar on the tractor and the planting means;

Figure 5 is an enlarged fragmentary perspective view of the rig hanger bracket; and Figure 6 is a fragmentary section taken along the line 6—6 of Figure 5.

Figure 1:
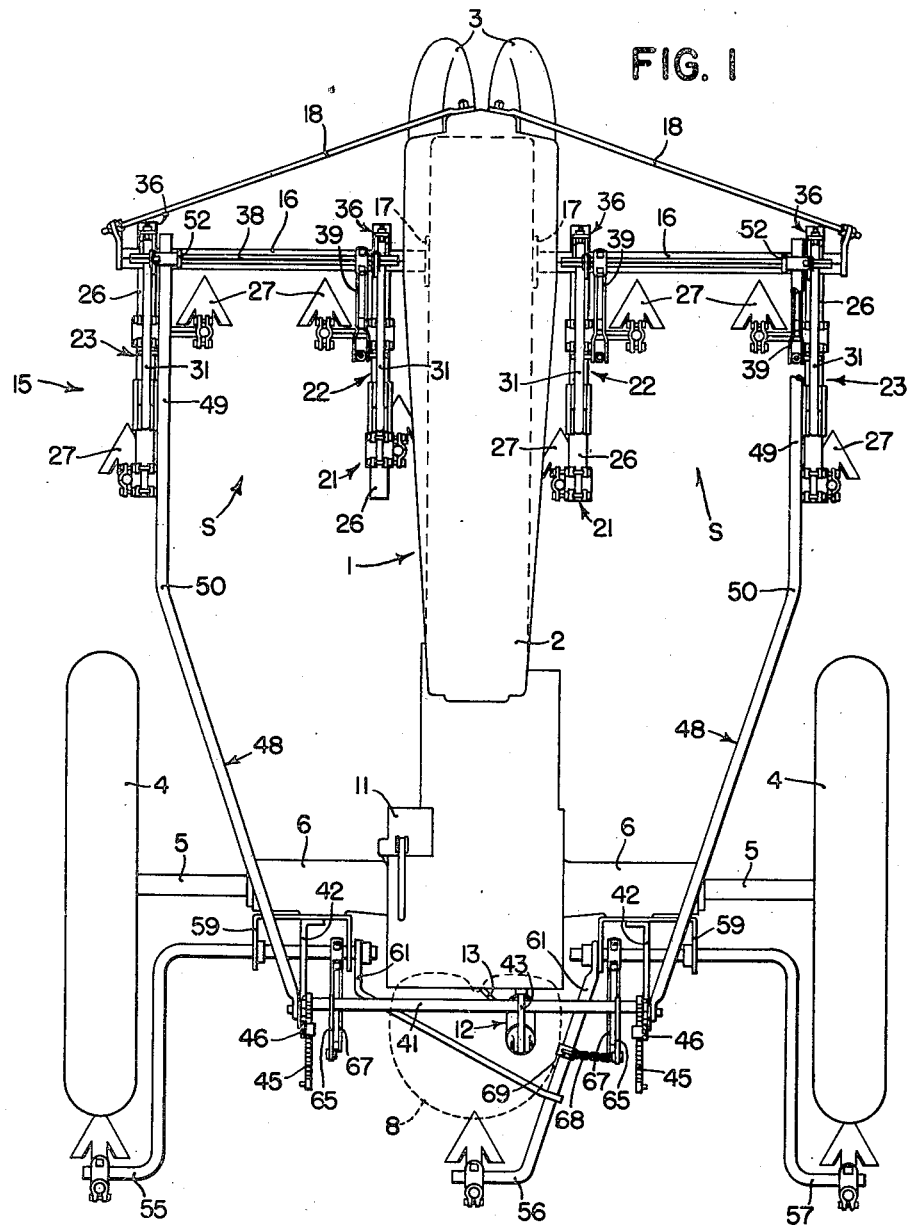
Figure 1 is a plan view of a tractor mounted cultivator in which the principles of the present invention have been incorporated.

Referring first to the tractor mounted cultivator shown in Figure 1, the tractor is indicated in its entirety by the reference numeral 1 and is of the well-known three wheel or tricycle type, including a narrow body 2, front wheel means 3 and laterally spaced rear wheels 4 fixed to axles 5 that are journaled for rotation in rear axle extensions 6. A seat 8 defines the operator's station at the rear of the tractor, and the latter also includes a power lift pump and valve unit 11 connected with the tractor so as to be driven from the tractor motor, and a hydraulic ram or piston and cylinder unit 12, suitably connected to the valve unit 11 by a flexible hose 13 or other connection.

The cultivating implement that is adapted to be mounted on the tractor 1 is indicated in its entirety by the reference numeral 15 and includes two laterally outwardly disposed tool supporting draft bars, each indicated by the reference numeral 16 and fixed to the tractor frame by side plates 17 and forward diagonal braces 18, the latter being connected to the laterally outer end of the draft bars 16. Cultivator rigs 21 are arranged in pairs at opposite sides of the tractor, the laterally inner cultivator rig 22 of each pair being disposed adjacent the side of the tractor while the laterally outer rig 23 is disposed laterally outwardly of the adjacent rig 22 with an open space S therebetween for the passage of the row of plants between the rigs 22 and 23 of each pair. Each of the several rigs includes a longitudinally extending tool bar 26 to which a number of spring trip shovels 27 are connected for attachment thereto in different positions of adjustment. A pair of parallel links 31, 32 are connected at their rear ends to a bracket 34 fixed to each rig or tool beam 26, and the forward ends of each pair of links 31 and 32 are connected to a bracket 36 fixed for lateral adjustment to the associated draft bar 16. As best shown in Figure 1, there are two pairs of cultivator rigs and therefore there are four brackets 36, two at each side. Each pair of brackets at each side of the tractor are provided with suitable bearing means receiving a transverse rock shaft 38. Each rock shaft carries a pair of arms 39 which are connected respectively to the lower links 32 of the sets of parallel links connecting the two rig beams at each side of the tractor to the draft bar 16. The rock shaft 38 and associated parts on each side of the tractor therefore serve as means for raising and lowering the rig beams into and out of transport position and into and out of different positions of adjustment for depth.

At the rear of the tractor, adjacent the operator's station 8 thereon, a transverse rock shaft 41 is rockably mounted in brackets 42 fixed to the rear axle extensions 6. The power lift cylinder 12 is connected through an arm 43 to rock the rock shaft 41. A sector 45 is fixed to each end of the rock shaft 41 and receives a manually operated depth adjusting lever 46, which may be fixed to the sector 45 by a conventional detent mechanism. A lifting member 48 is connected at its rear end to each hand lever 46 and extends laterally outwardly and forwardly with respect to the tractor, terminating in a forward portion 49 that is disposed substantially in the same vertical plane as the associated outer rig 23, each lifting member being bent, as at 50. The forward end of each lifting member 48 is pivoted to a generally vertically extending arm 52 fixed at its lower end to the outer end portion of the associated rock shaft 38.

By actuating the valve mechanism of the power lift unit 11, energy is derived from the tractor motor for causing the cylinder and piston unit 12 to swing the rear transverse rock shaft 41 from one position to the other, this motion acting through the two lifting members 48 to rock both rock shafts 38, thereby raising or lowering all of the rigs simultaneously. The pair of rigs at either side may be raised or lowered independently of the rigs at the other side by unlatching the lever 46 at that side of the tractor from the associated sector 45 and swinging the lever 46 either forwardly or rearwardly, as desired. The parts are so arranged that the lever 46 has a range of movement sufficient to permit the associated rigs to be lifted clear of the ground independently of the position of the power lift rock shaft 41. Therefore, by using one or the other of the hand levers, either pair of rigs 22, 23 may be raised or lowered as desired.

Three rear rigs 55, 56 and 57 are provided, the outer rigs 55 and 57 being rockably mounted in brackets 59 fixed to the rear side of the rear axle housing extensions 6, and the center rig 56 is provided with laterally separated forward ends 61 which are rockably disposed on the laterally inturned ends of the laterally outer rig beams 55 and 57. A pair of arms 65 are fixed to the rock shaft 41 laterally inwardly of the sectors 45, and a chain 66 extends downwardly from each arm 65 and connects to an arm 67 fixed to the associated rig, 55 or 57. A third chain 68 extends from the right hand arm 65 downwardly to a clip 69 fixed to the central rig 56.

By virtue of the bent portion 50 in each of the lifting members 48, a connection is established between the laterally outer end portions of the forward rock shafts 38 and the two lifting levers 46, which are disposed fairly close together and adjacent the operator's station 8 on the tractor, yet the forward end portions 49 of the lifting members are disposed laterally outwardly, respectively, of the spaces S so that an operator seated or standing at the station 8 has the entire portion of each space S clearly within an unobstructed view, particularly since the lifting members 48 lie outside of the lines or planes extending downwardly from the operator's eye to the margins of the spaces S.

Coming now to the planting attachment that is particularly adapted to be associated with the cultivator described above, a seed container 75 and a fertilizer container 76 are mounted in any suitable way on the tractor, such as by means of a bracket 77, the latter being fixed to the tractor so as to dispose the containers 75 and 76 well forward in the space S between the associated lifting member 49 and the side of the tractor. It will be understood that the planting attachment in which the principles of the present invention comprises a right hand unit and a left hand unit, such units being substantially identical except that certain parts thereof may be right hand while others are left hand. Therefore, a complete description of only one of the planting units of the attachment will be necessary. The right hand unit, in addition to the parts just mentioned, also include a supporting base 78 on which the seed and fertilizer containers 75 and 76 are mounted. The base 78 also includes mechanism for driving the selecting and distributing means associated with the seed and fertilizer containers, and such mechanism is driven by a chain 81 from a sprocket 82 on the right hand axle shaft 5. Except for the particular way of driving the seed selecting and fertilizer distributing means, the seed and fertilizer cans 75 and 76 and associated parts are substantially the same as shown in the U. S. Patent No. 2,319,758, issued May 18, 1943, to Charles H. White, to which reference may be made if necessary. The supporting bracket 77 is reenforced by a brace 83 that extends generally longitudinally, and is connected at its rear end with the laterally outer end of the bracket 77 and at its forward end receives a clamping U-bolt 84 by which the front end is firmly fixed to the associated draft bar 16.

Each planting means includes a furrow opener 91, which comprises a runner 92 having a seed boot 93 to which the lower end of a feed tube 94 is connected. The upper end of the tube 94 is carried by a funnel or spout 95 fixed to the supporting base 78. The seed selected by the seed selecting mechanism drop downwardly through the tube 94 into the furrow opened by the furrow opener 91. The latter member includes a frame having a pair of plates 97 that are formed with forward vertical portions 98. Upper and lower links 101 and 102 are pivoted at their rear ends to the plate sections 98, preferably between the latter, and the forward ends of the upper and lower links 101 and 102 are pivotally connected to the upper and lower portions of a bracket 105 that is fixed to the associated draft bar 16 in between the cultivator rig brackets 36. The runner plate sections 98 are held in closely spaced relation with respect to the links 101 and 102 and, in effect, form a rear bracket to which the fertilizer furrow opener is connected. Likewise, the front bracket 105 is composed of laterally spaced parts fitting closely against the sides of the front ends of the upper and lower links 101 and 102. By virtue of this construction, the furrow opener 91 is held more or less rigidly against lateral displacement but is permitted to swing vertically. Since the bracket 105 is disposed on the draft bar 16 in a position substantially midway between the cultivator rig brackets 36, the planting means is therefore held in a similarly intermediate position between the cultivator rigs, yet can swing vertically between and relative to the latter. Connected to the seed furrow opener 91 is a pair of press wheels 111 and a pair of covering arms 112, which parts are of more or less conventional construction. A fertilizer furrow opener 115 is fixed by a bracket 116 rigidly to the laterally outer plate 97 of the seed furrow opener unit 91. A tube 117 leads downwardly from the fertilizer container 76 and conducts fertilizer into the furrow opened by the furrow opener 115. The front end of the bracket 116 is slotted, as at 120, to provide for vertical adjustment of the position of the fertilizer furrow opener 115 relative to the seed furrow opener 91. Preferably, the fertilizer furrow opener 115 is fixed in a position in which the fertilizer is disposed to one side of and below the furrow opened by the seed furrow opener 91. The fertilizer furrow opener 115, being rigidly connected with the seed furrow opener 91, moves vertically with the latter, as permitted by the generally parallel links 101 and 102.

Figure 2:
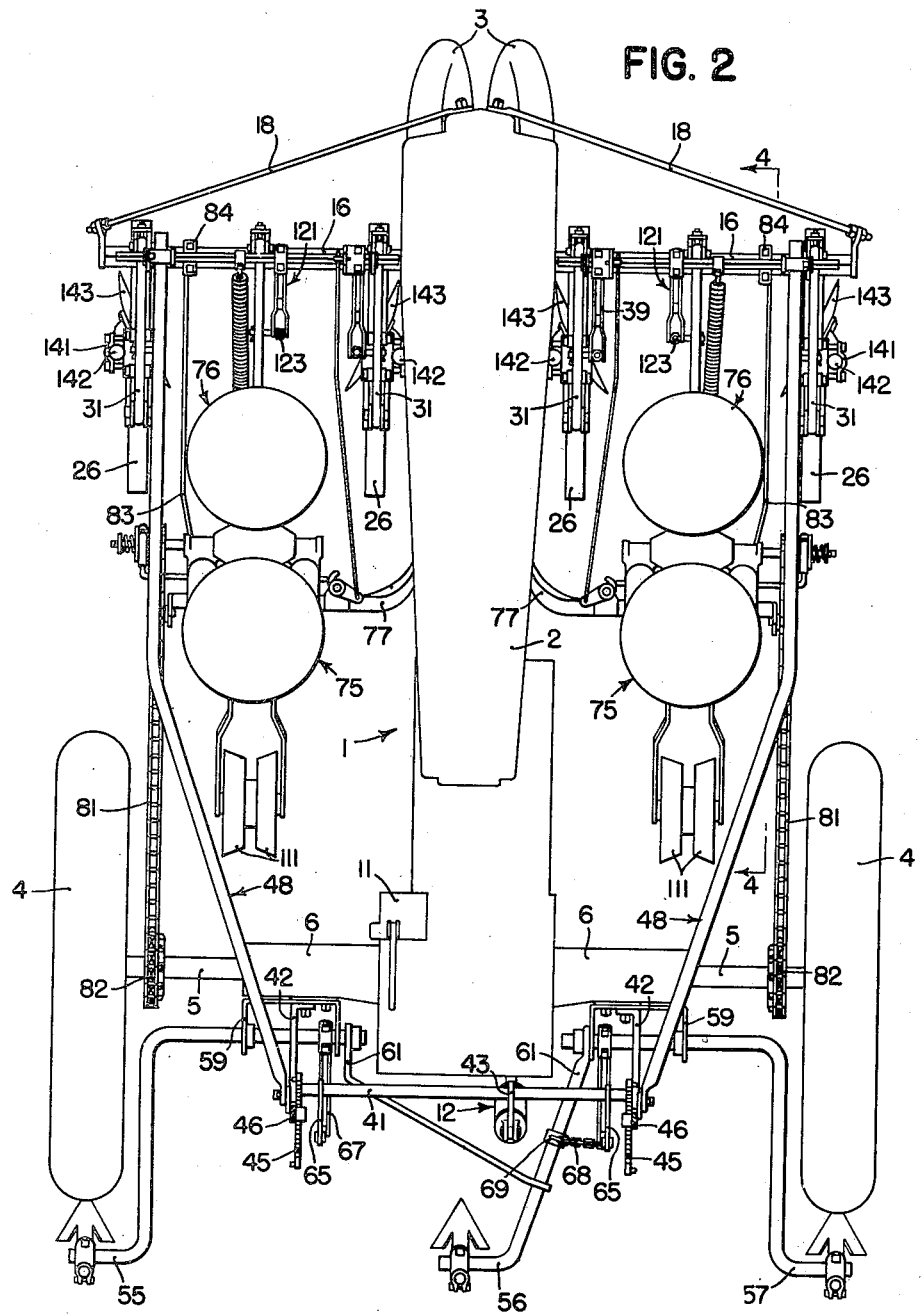
Figure 2 is a view similar to Figure 1, showing the cultivator of Figure 1 equipped with a planting attachment constructed according to the principles of the present invention.

As best shown in Figure 2, the rock shaft 38, to which the cultivator lifting arms 39 are connected carries a planter lifting arm 121 of similar construction and likewise fixed to the rock shaft 38 but appreciably shorter in length. As best shown in Figure 4, a link 123 extends downwardly through a swiveled member 124, carried at the rear or outer end of the planter lifting arm 121, and at its lower end the lifting rod 123 is pivotally connected with the lower planter link 102 fairly close to the point at which the latter is connected with the bracket 105 for vertical swinging movement. The upper end of the rod 123 is threaded and carries a pair of stop nuts 126 which normally are disposed on the rod 123 so that there is a space s between the end of the lifting arm 121 and the nuts 126. This space provides lost motion between the arm 121 and the planter links, and will be referred to below. A spring 125 may be provided for balancing the weight of the planter unit, as when planting cotton on top of beds or in operations where the soil is loose or sandy. The spring 125 preferably is fastened by clips 128 and 128' to the rock shaft 38 and the link 102, respectively. Under other conditions, as when planting corn or other crops where gauge shoes are not used, the spring 125 may be omitted and downward pressure placed on the runner by a spring disposed about the lifting rod 123. Such a spring, the position of which is shown in dotted lines at 127 in Figure 3, may bear at its upper end against the swivel 124 and at its lower end against a set screw collar 129.

Figure 3:
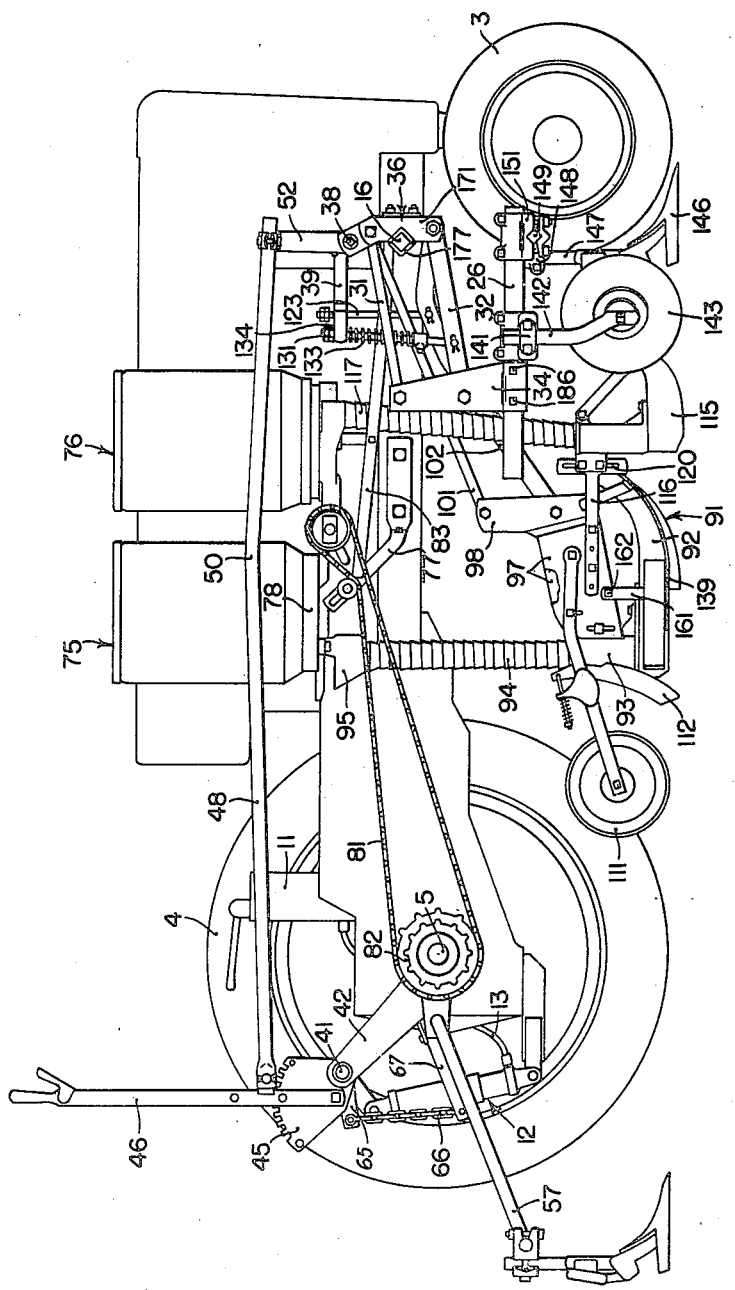
Figure 3 is a side view of the implement shown in Figure 2.

As best shown in Figure 3, each of the cultivator rigs is controlled by its lifting arm 39 through a rod 131 connected at its lower end with the lower link 32 and at its upper end with the lifting arm 39, there being a spring 133 disposed about the rod 131 and arranged to apply downward pressure to the cultivator rigs. In the case of the cultivator rigs, however, the stop nuts 134, which limit the downward movement of the cultivator rigs, normally engage the swivel at the rear end of the associated lifting arm 39 whereby the rock shaft 38 may be rocked in one direction or the other to raise or lower the cultivator rig beams and tools connected therewith. This adjusting movement, however, does not affect the position of the planting means because of the lost motion between the planter lifting arm 121 and the associated rod 123, as indicated at s, and similarly, such movement of the arm 121 as may take place when rocking the rock shaft 38 to adjust the position of the cultivator rigs does not materially vary the tension exerted by the spring 127, when one is used, because the arm 121 is relatively short.

As shown in Figure 3, the planter furrow openers 91 may be equipped with gauge shoes 139, and preferably this is done when planting on beds. In this case the hold down springs 127 are usually not required.

Various kinds of tools may be mounted on the cultivator rig beams as conditions may require. For example, cultivator shovels, such as those shown in Figure 1, may be left attached to the cultivator rig beams where it is desired to cultivate at the same time the planting is done. However, as shown in Figure 3, in which the parts are arranged for planting on beds, the cultivator rig or tool beams 26 are provided with clamping members 141 in which a supporting standard or shank 142 is fixed. A hilling disk 143 is journaled for rotation on the lower end of each of the standards or shanks 142. The function of the hilling disks when arranged in this manner is to form the bed along the top of which the planter furrow opener 91 passes just behind the fertilizer furrow opener 115. To aid in this operation, a shovel 146 for loosening the ground is fixed to a shank or support 147 that at its upper end is secured by a clamp 148 to a spread bar 149. The latter member is disposed transversely and is firmly fixed at its ends by clamps 151 to the forward ends of the cultivator rig beams 26.

Various other kinds of tools may be mounted on the rig beams 26. For example, the shovel 146 may be replaced by a furrow opener where it is desired to plant in the bottoms of furrows instead of on beds as described above. When planting on flat ground, the disk hillers and furrow opening shovels described above may be replaced by cultivator shovels, such as those indicated by the reference numeral 27 in Figure 1. If desired, a marker may be attached to the laterally outer rig beam 26 similar to the marker structure shown in my prior U. S. Patent No. 2,319,737, issued May 18, 1943, to which reference may be made if necessary.

The planter runner shoes 139 are, as best shown in Figure 4, capable of being adjusted relative to the runner frame plates 97. The shoes 139 associated with each planter runner 92, has fixed to the rear ends thereof struts 161, the upper ends of which are apertured to receive attaching bolts 162. The front ends of the gauge shoes 139 have brackets 163 fixed thereto, the upper ends of the brackets being slotted, as indicated at 164. A bolt 165 secures the upper ends of the brackets 163 to the forward portion of the associated runner frame plate. By loosening the bolts 161 and 165 and shifting the position of the brackets 163 relative to the bolt 165, the gauge shoes 139 may be tilted upwardly or downwardly as desired.

The cultivator rig beams brackets 36 and the brackets 105 to which the forward ends of the planting unit links 101 and 102 are connected are of particular construction and are similar except that the brackets 36 have extensions supporting the rock shaft 38. Referring now to Figure 5, which shows in detail the cultivator rig link bracket 36, it will be noted that each cultivator bracket 36 consists of a pair of plates 171 and 172 having a transverse plate 173 welded to the forward edges of the plates 171 and 172. The rear edges of the plates 171 and 172 are notched to receive a V-shaped saddle member 175 which is also welded to the plates 171 and 172. The forward plate 173 is apertured to receive ends 176 of a generally U-shaped clamping bolt. The ends are threaded to receive nuts 177. The rear portion of the clamping bolt embraces the rear side of the draft bar, the saddle member 175 fitting against the forward side thereof. Therefore, by tightening the nuts 177, the bracket 36 may be securely fixed to the draft bar supporting it.

The side plates 171 and 172 extend vertically in opposite directions from the forward plate 173 to provide bifurcated portions to receive the forward ends of the links 31 and 32. The latter preferably is in the form of a rectangular bar while the upper member 31 is preferably in the form of a round rod. The spacing between the plates 171 and 172 is only slightly in excess of the thickness of the link members 31 and 32. The forward ends of the links are apertured to receive bushings (not shown) and through the bushings are extended bolts 181 which also pass through apertures in the upper and lower ends of the plate members 171 and 172. The length of the bushings determines the clearance between the links and the bifurcated portions of the bracket 36 receiving them, and the clearance is such that while relatively free vertical movement is accommodated the links 31 and 32 are held quite firmly against lateral displacement, due largely to the relatively wide contact between the ends of the plates 171 and 172 and the forward ends of the links 31 and 32. The rear end of the lower link 32 is disposed between the intermediate portions of a pair of rig plates 184 and 185 which comprise the bracket 34 and are fixed, as by bolts 186, to the associated rig beam 26. The pivot connection between the rear end of the link 32 and the plates 184 and 185 is substantially as described above, by which the relatively wide contact between the plates and the rear end of the lower link prevents any lateral displacement of the associated rig beam 26. The upper ends of the plates 184 and 185 are slotted at 187 (Figure 6) to receive a bolt 188 which passes through a bushing 189 carried at the rear end of the upper link 31. The bushing 189 is slightly longer than the thickness of the link 31. A pair of washers 191 is disposed under the head and nut of the bolt 188, and since the latter is disposed in slots in the upper ends of the plates 184 and 185, the associated rig beam may be leveled by loosening the bolt 188 and shifting it relative to the plates 184 and 185, and then tightening the plates against the end of the bushing 189, as shown in Figure 6.

The bracket 105 to which the forward ends of the planting unit links 101 and 102 are connected, is constructed substantially exactly as just described in connection with the bracket 36, and hence detailed description is believed unnecessary. The parts of the bracket 105 corresponding to the bracket 36 are indicated by the same reference numerals with primes added.

While I have shown and described above the preferred structure in which the principles of the present invention have been incorporated, it is to be understood that my invention is not to be limited to the particular means shown and described above but that, in fact, widely different means may be employed in the practice of the broader aspects of my invention.

What I claim, therefore, and desire to secure by Letters Patent is:

1. In a tractor mounted implement, a transverse draft member adapted to be attached to the tractor, a pair of laterally spaced tool supporting members individually connected with said draft member for generally vertical movement, ground working tool means carried thereby, and a planter attachment adapted to be connected with the tractor and including a seed furrow opener, and means connecting the latter with said draft member between said laterally spaced tool supporting members, said seed furrow opener being movable independently of said tool supporting members.

2. A tractor mounted implement comprising a transverse draft member adapted to be attached to the tractor, a pair of laterally spaced tool receiving members, means including a pair of parallel links and a bracket attachable to said draft member for connecting each of said tool receiving members with said draft member, planting means disposed generally between said tool receiving members, a rockshaft mounted on said brackets, means connecting said planting means with said draft bar and including a bracket attachable to said draft member between said first mentioned brackets and a pair of parallel links connecting said third bracket with said planting means, and means connecting said rockshaft with at least one link of each of said three pairs of links, whereby said rockshaft may be rocked to raise both of said laterally spaced tool receiving members and said planting means.

3. A tractor mounted implement comprising a draft bar adapted to be attached to said tractor and extend laterally therefrom, a pair of independently swingable laterally spaced tool receiving members movably connected with said draft bar, a planting unit also movably connected with said draft bar and disposed in between said tool receiving members and movable independently of the latter, and common means for raising both said pair of tool receiving members and said planting unit.

4. In an agricultural implement including transverse draft beam, tool means, and links connected with said tool means, a draft bracket including a pair of side plates, spaced apart a distance substantially equal to the thickness of said links, link-receiving pivot members carried at the upper and lower ends of said side plates, said links being disposed between and held against lateral displacement by said side plates, securing means for clamping said draft bracket to said draft beam, one of said side plates being extended to form a bearing support, a rockshaft mounted for rocking movement on said bearing support, and means operatively connecting said rockshaft with one of said links whereby rocking of said rockshaft raises said tool means, the other of said side plates being shorter than said extended plate so as to provide clearance for said rockshaft to extend along the transverse draft beam and over the shorter side plate.

5. In an agricultural implement including transverse draft beam, tool means, and links connected with said tool means, a draft bracket comprising a pair of side plates, a transverse plate secured to the forward edges of said side plates, the rear edges of said side plates being notched, a beam-engaging saddle member fixed to the notched portions of said side plates, said saddle member and transverse plate serving to hold the side plates spaced apart a distance substantially equal to the thickness of said links, link-receiving pivot members carried at the upper and lower ends of said side plates, said links being disposed between and held against lateral displacement by said side plates, securing means acting against said transverse plate and said draft beam for clamping said draft bracket thereto with said saddle member engaging said draft beam, one of said side plates being extended to form a bearing support, a rock shaft mounted for rocking movement on said bearing support, and an arm fixed on said rock shaft and connected with one of said links whereby rocking of said rock shaft raises said tool means, the other of said side plates being shorter than said extended plate so as to provide clearance for said rockshaft to extend along the transverse draft beam and over the shorter side plate.

6. The combination with a tractor mounted cultivator including a laterally extending draft bar carried by the tractor and a pair of laterally spaced cultivator rig beams movably connected with said draft bar, of a planting attachment comprising a planting unit disposed between said rig beams, means floatingly connecting said planting unit with said draft bar for movement relative to said rig beams, a cross bar attached to the forward ends of said rig beams, and a ground engaging tool disposed forwardly in longitudinal alignment with said planting unit and fixed to the cross bar carried by said rig beams.

7. The combination with a tractor mounted cultivator including a laterally extending draft bar carried by the tractor, a pair of laterally spaced cultivator rig beams movably connected with said draft bar, and a rock shaft mounted on said laterally extending draft bar and connected with said cultivator rig beams for raising the latter, said rock shaft also extending laterally outwardly of the tractor, of a planting attachment comprising a seed container, means for supporting said container at the side of the tractor, a seed furrow opener adapted to receive seed from said container and disposed for movement between said rig beams, means floatingly connecting said seed furrow opener with said draft bar between said rig beams, means connecting said seed furrow opener with said rock shaft whereby movement of the latter to raise said cultivator rig beams also raises said seed furrow opener, a generally longitudinally extending lift member connected at its forward end with the outer end portion of said rock shaft and having an outward bend intermediate its ends so as to clear said seed container, and means at the rear of the tractor and connected with the rear end of said lift member for shifting the latter to rock said rock shaft and raise said cultivator rig beams and said seed furrow opener.

8. A tractor mounted cultivator adapted to be supported on a tractor having an operator's station thereon, comprising a pair of laterally spaced apart cultivator units at each side of the tractor, a pair of raising and lowering levers mounted on the tractor, one at each side of the operator's station thereof, and a generally longitudinally disposed lifting member extending from each lever to the associated pair of rigs at that side of the tractor, the forward portion of each of said lifting members being disposed substantially in the vertical plane of the outer rig of the associated pair of rigs so as to lie generally outside of the planes passing through the eye of the operator at said station and the extremities of the open space between the two cultivator units at that side of the tractor.

9. A tractor mounted cultivator adapted to be supported on a tractor having a relatively narrow body and an operator's station at the rear of the latter, comprising a laterally outwardly disposed cultivator rig at each side of the tractor, arranged with an open space laterally inwardly of each rig between the latter and the side of the tractor body, a pair of raising and lowering levers mounted on the tractor adjacent the operator's station, and a lifting member at each side of the tractor, each lifting member being connected at its rear end with the lever at that side of the tractor and extending generally forwardly and laterally outwardly and, at its forward portion, disposed adjacent the vertical plane of the rig at that side of the tractor.

10. A tractor mounted cultivator adapted to be supported on a tractor having a relatively narrow body and an operator's station at the rear of the latter, comprising a laterally outwardly disposed cultivator rig at each side of the tractor, arranged with an open space laterally inwardly of each rig between the latter and the side of the tractor body, a pair of raising and lowering levers mounted on the tractor adjacent the operator's station, and a lifting member connected with each lever and the rig at that side of the tractor, said lifting member including a portion extending forwardly and laterally outwardly from said lever and a portion forwardly thereof that extends generally longitudinally and is disposed generally in the vertical longitudinal plane of the cultivator rig, whereby the operator has an unobstructed view of the space between the cultivator rig and the side of the tractor inwardly thereof.

11. A tractor mounted cultivator adapted to be supported on a tractor having an operator's station thereon, comprising a transversely extending draft bar extending laterally outwardly from each side of the tractor, a pair of cultivator rigs connected with each of said laterally outwardly extending draft bars in laterally spaced relation with an open space therebetween so as to pass on opposite sides of a plant row, a rockshaft operably connected with the associated rigs on each draft bar for raising and lowering them, raising and lowering means on the tractor adjacent the operator's station thereon, and a pair of generally longitudinally extending members extending from a point adjacent the operator's station to the laterally outer portions of said rockshaft at each side of the tractor, said longitudinally extending members being thereby disposed laterally outwardly of lines extending from the eye of the operator at said station to the laterally outer margins of said space, whereby the operator has unobstructed vision of the plant rows along which the cultivator rigs pass.

12. A tractor mounted cultivator adapted to be supported on a tractor having an operator's station at the rear thereof, comprising a pair of draft bars fixed to the tractor extending laterally outwardly thereof from opposite sides of the tractor, a pair of laterally spaced apart cultivator rigs connected with each draft bar at each side of the tractor, there being an open space between the cultivator rigs of each pair to accommodate the passage of the cultivator rigs along plant rows, a rock shaft disposed transversely of the tractor and supported for rocking movement on each of said draft bars, means connecting each rock shaft with the associated cultivator rigs for raising and lowering them, raising and lowering means on the tractor adjacent said operator's station at the rear thereof, an arm fixed to the laterally outer end portion of each of said rock shafts and disposed substantially in the vertical longitudinal plane of the associated laterally outer rig, and a pair of longitudinally extending members connected at their forward ends to said arms and at their rear ends with said raising and lowering means, said members being disposed in positions so that the operator's view of the spaces between said rigs is not obstructed.

13. The combination with a tractor mounted cultivator as defined in claim 12, of a pair of planting units adapted to be connected to said draft bars between said laterally spaced apart cultivator rigs, means for raising said planting units when said cultivator rigs are raised, and seed containers mounted on the tractor and disposed in the forward portion of the space between said longitudinally extending members and the adjacent side of the tractor.

14. The combination of supporting means, ground working means and planting means independently connected with said supporting means for movement one with respect to the other, raising means for said ground engaging means, lost motion means connecting said planting means with said raising means whereby said planting means is capable of movement relative to said ground engaging means, operation of said raising means serving to begin the raising of said ground engaging means before raising said planting means, and means whereby said lost motion means, after the lost motion has been taken up, raises said planting means faster than said ground engaging means, whereby both said ground engaging means and said planting means are brought to approximately the same height when completely raised.

15. The combination with a tractor mounted cultivator including a laterally extending draft bar carried by the tractor, a pair of laterally spaced cultivator beams movably connected with said draft bar, a transverse rock shaft mounted on said draft bar, and means including a pair of relatively long lifting arms carried by said rock shaft and connected with said rig beams for raising the latter, of a planting attachment comprising a planting unit movably disposed between said rig beams and connected for vertical movement with said draft bar, a relatively short arm fixed to said rock shaft in between said longer arms, a lost motion connection associated with said shorter arm, and means connecting said lost motion connection with said planting unit whereby after said lost motion has been taken up, said shorter arm raises said planting unit faster than the corresponding movement of said rock shaft raises said cultivator rig beams, whereby the latter and said planting unit may be raised to approximately the same height for transport.

16. In an agricultural implement, supporting means, a pair of relatively movable parts, means respectively connecting said relatively movable parts with said supporting means, each comprising a member pivoted to said supporting means, a pair of interconnected arms mounted for rocking movement on said supporting means, means connecting one of said arms with one of said members at a point spaced from the pivot axis thereof for raising the part associated therewith, and lost motion means connecting the other member with the other arm, said lost motion means providing for movement of said other part relative to said one part, said lost motion means being connected with said other member at a point spaced from the pivot axis thereof a distance less than the distance from said first mentioned point and the pivot axis of said one member, whereby after said lost motion has been taken up said other part is raised faster than said one part so that both may be raised to approximately the same height.

17. The invention set forth in claim 16, further characterized by said other arm being relatively short, and spring means acting between said relatively short arm and said other member whereby movement of said interconnected arms to adjust the position of said one member causes only a relatively small change in the force exerted by said spring.

18. The combination of a tractor, a laterally extending draft bar secured thereto, a pair of laterally spaced cultivator rigs movably connected with said bar, ground working tool means supported thereby, a rockshaft mounted on said laterally extending draft bar and connected with said cultivator rigs for raising the latter, a planting unit disposed between said cultivator rigs and movably connected with said draft bar for movement independent of said rigs, and means connecting said planting unit with said rockshaft whereby movement of the latter to raise said cultivator rigs also raises said planting unit.

19. The combination of a tractor, a laterally extending draft bar secured thereto, a pair of laterally spaced cultivator rigs movably connected with said bar, ground working tool means supported thereby, a planting unit disposed between said cultivator rigs, and means connecting said planting unit with said draft bar for movement relative thereto independent of said rigs.

20. The combination with a tractor mounted cultivator including a laterally extending draft bar carried by the tractor and a pair of laterally spaced cultivator rig beams movably connected with said draft bar, of a planting attachment comprising a seed container, means for supporting said container on said tractor, a seed furrow opener adapted to receive seed from said container and disposed for movement between said rig beams, and means floatingly connecting said seed furrow opener with said draft bar between said rig beams.

21. The combination with a tractor mounted cultivator including a laterally extending draft bar carried by the tractor, a pair of laterally spaced cultivator rig beams movably connected with said draft bar, and a rock shaft supported on said draft bar and connected with both of said rig beams for raising the latter, of a planting attachment comprising a seed furrow opener adapted to be disposed for generally vertical movement between said rig beams, means floatingly connecting said seed furrow opener with said draft bar between said rig beams, and means connecting said seed furrow opener with said rock shaft whereby movement of the latter to raise said rig beams also raises said seed furrow opener.

22. The combination with a tractor mounted cultivator including a laterally extending draft bar carried by the tractor and a pair of laterally spaced cultivator rig beams movably connected with said draft bar, of a planting attachment comprising a planting unit disposed between said rig beams, means connecting said planting unit with said draft bar for movement relative to said rig beams, and a hilling tool connected with each rig beam forwardly of and at one side of said planting unit.

23. The combination with a tractor mounted cultivator including a laterally extending draft bar carried by the tractor and a pair of laterally spaced cultivator rig beams movably connected with said draft bar, of a planting attachment comprising a planting unit disposed between said rig beams, means floatingly connecting said planting unit with said draft bar for movement relative to said rig beams, a cross bar attached to the forward ends of said rig beams, and ground engaging tool means carried by said cross bar forward of said planting unit.

24. The combination with a tractor mounted cultivator including a laterally extending draft bar carried by the tractor, a pair of laterally spaced cultivator rig beams movably connected with said draft bar, means reacting against said draft bar and connected with the rig beams for raising the latter, of a planting attachment comprising a planting unit movably disposed between said rig beams and connected for vertical movement with said draft bar, and means having a lost motion connection with said planting unit and connected with said rig raising means for raising the planting unit therewith, said lost motion connection accommodating movement of the planting unit relative to said rig beams during operation.

25. The combination with a tractor mounted cultivator including a laterally extending draft bar carried by the tractor, a pair of laterally spaced cultivator rig beams movably connected with said draft bar, means reacting against said draft bar and connected with the rig beams for raising the latter, of a planting attachment comprising a planting unit movably disposed between said rig beams and connected for vertical movement with said draft bar, and means having a lost motion connection with said planting unit and connected with said rig raising means for raising the planting unit therewith, said lost motion connection accommodating movement of the planting unit relative to said rig beams during operation, said planting unit raising means being arranged to raise the planting unit faster than the rig beams.

26. The combination with a tractor mounted cultivator including a laterally extending draft bar carried by the tractor and a pair of laterally spaced cultivator rig beams movably connected with said draft bar, of a planting attachment comprising a planting unit disposed between said rig beams, means floatingly connecting said planting unit with said draft bar for movement relative to said rig beams, a ground engaging tool disposed forwardly in longitudinal alignment with said planting unit, and means carrying said tool on said rig beams.

THEODORE W. JOHNSON.